July 12, 1927.
W. G. EXTON
1,635,470
METHOD OF AND APPARATUS FOR MEASURING TURBIDITIES AND COLOR OF FLUIDS
Filed June 23, 1922 2 Sheets-Sheet 1
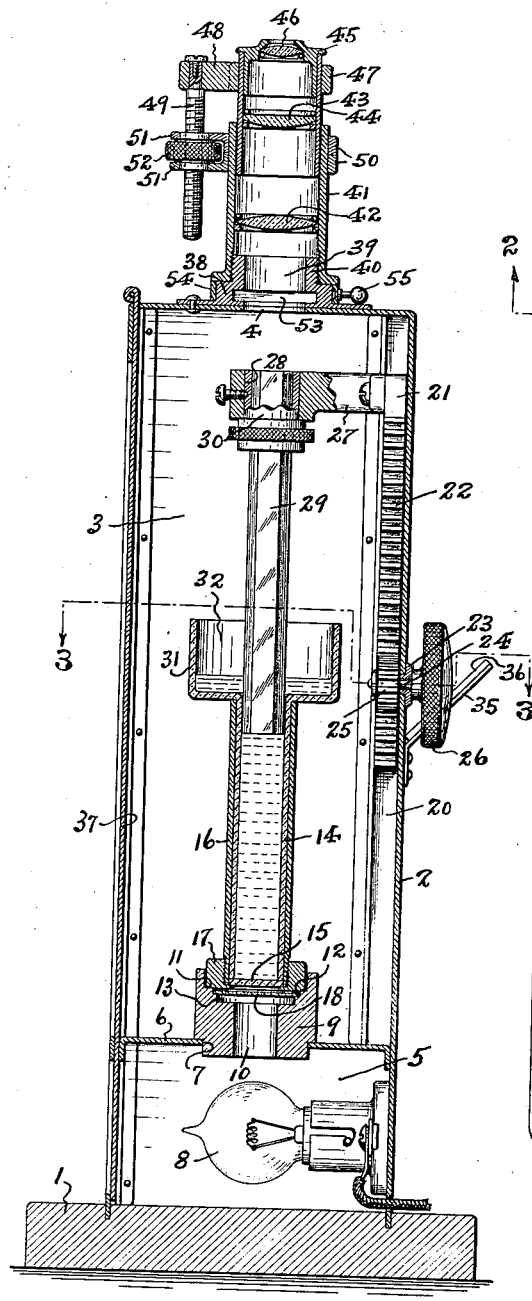
Fig. 2
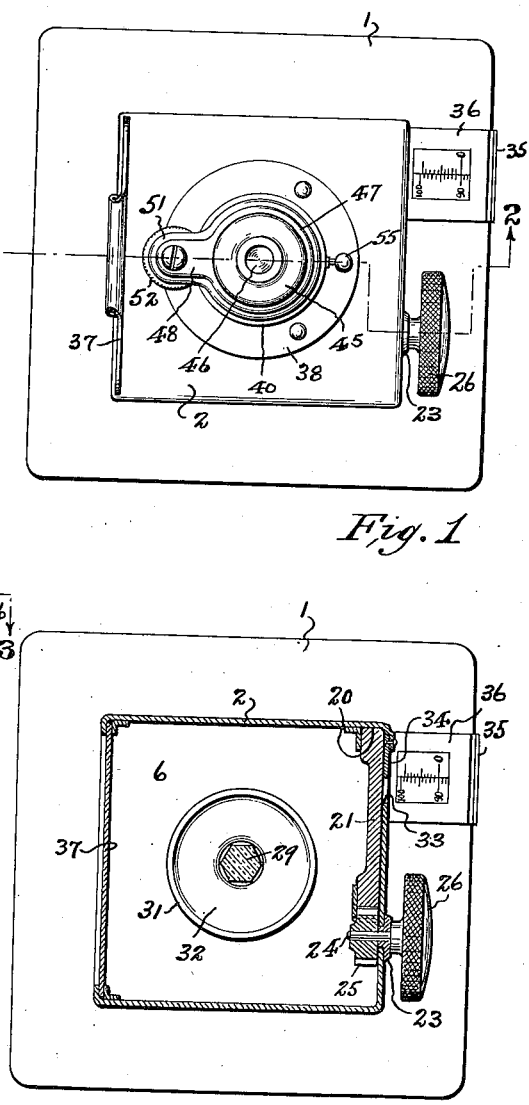
Fig. 1
Fig. 3
INVENTOR.
William G. Exton,
BY
Fraentzel and Richards
ATTORNEYS.

July 12, 1927.

W. G. EXTON 1,635,470

METHOD OF AND APPARATUS FOR MEASURING TURBIDITIES AND COLOR OF FLUIDS

Filed June 23, 1922 2 Sheets-Sheet 2

INVENTOR.
William G. Exton,
BY
Fraentzel and Richards
ATTORNEYS.

Patented July 12, 1927.

1,635,470

UNITED STATES PATENT OFFICE.

WILLIAM G. EXTON, OF NEW YORK, N. Y.

METHOD OF AND APPARATUS FOR MEASURING TURBIDITIES AND COLOR OF FLUIDS.

Application filed June 23, 1922. Serial No. 570,459.

This invention relates to a novel means for measuring turbidities and colors of fluids by optical observation.

The invention has for its principal objects to provide a novel instrument for practicing a method by which the cloudiness or turbidity of a fluid may be directly measured, which consists in interposing a practicable or comparatively small quantity of the fluid to be measured between an optical viewing instrument and a specially prepared and illuminated target, and then by varying the depth of the fluid to produce a predetermined visual effect or appearance of the target, which indicates the measuring point readable on a scale arranged to vary as the depth of the measured fluid varies and also to provide, in connection with the novel instrument, a color filter or screen, either in place of or in conjunction with the aforesaid target, whereby said instrument is adapted to be utilized to practice, as a modification or alternative of the method above mentioned, a method whereby the color of a fluid may be directly measured in a similar manner.

Other objects of this invention, not at this time more particularly enumerated, will be clearly understood from the following detailed description of the same.

The novel construction of instrument, which is designed to provide the novel means for practicing the methods involved in this invention, is clearly illustrated in the accompanying drawings, in which:—

Figure 4:
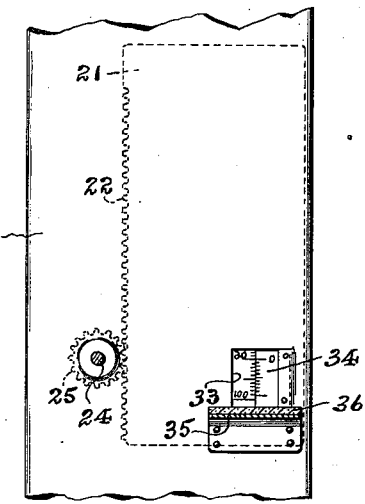
Figure 6:
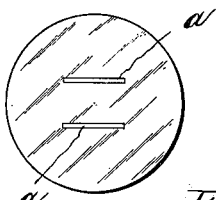
Figure 7:
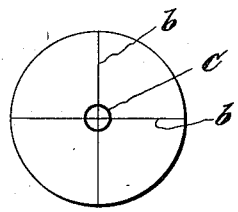
Figure 5:
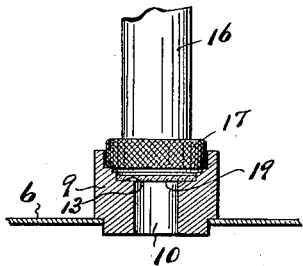
Figure 8:
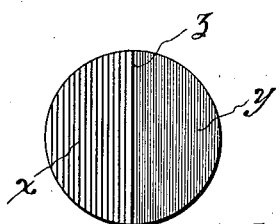

Figure 1 is a top end plan view of said instrument; Figure 2 is a vertical longitudinal section of the same, taken on line 2—2 in said Figure 1; Figure 3 is a horizontal transverse section through the same, taken on line 3—3 in said Figure 2; Figure 4 is a fragmentary rear side view, illustrating the scale reading aperture; Figure 5 is a fragmentary vertical section of a holder block and fluid-cup, showing a color filter associated therewith; and Figures 6, 7 and 8 are respectively face views of various forms of targets employed with the apparatus.

Similar characters of reference are employed in all of the above described views, to indicate corresponding parts.

Referring now to said drawings, the reference character 1 indicates a base upon which is mounted a casing 2 providing an interior enclosed chamber 3. Said casing 2 is closed at its top except for a centrally disposed aperture 4. Arranged in the lower end of said casing 2, and spaced upwardly from the base 1 to provide an illumination chamber 5, is a transverse horizontal partition 6 having a central opening or seat 7. Fixed within said illumination chamber 5, so as to be disposed beneath the opening or seat 7, is a source of light, such, e. g., as an electric lamp 8. Supported by said partition 6 in connection with said opening or seat 7 is a holder-block 9 having an axial opening or light passage 10 extending upwardly therethrough from its lower end. The upper end of said holder-block 9 is provided with a series of annular seats counter-sunk at three levels to provide a fluid cup seat 11 at the top, a target seat 12 of reduced diameter below said fluid cup seat 11, and color filter seat 13 of further reduced diameter below said target seat 12.

The reference character 14 indicates a fluid holding cup, preferably made of glass and having a cylindrical bore, the lower end thereof being closed by a transparent bottom member 15 made of optical glass. The sides of said fluid cup 14 are enclosed in a light-proof sheath or sleeve 16 connected at its lower end with an enlarged ferrule 17 of a diameter adapted to enter and be supported by the fluid cup seat 11 of the holder-block 9, so that the fluid cup 14 is axially alined above the light passage 10 of the holder-block 9.

When using the device to measure turbidities, a suitable target 18 is disposed in the target seat 12, so as to be interposed between the bottom of the fluid cup 14 and the light source. The various types of targets which I may employ will be subsequently more fully described When using the device to measure the color of a fluid, a suitable filter or screen 19 is disposed in the color filter seat 13, so as to be interposed between the bottom of the fluid cup 14 and the light source. The color filters or screens, and the functions of the same, will also be subsequently more fully described.

Arranged within said casing 2, at one side thereof, for vertical up and down movement between guideways 20, is a combined rack member and scale plate 21, the same having its teeth 22 extending along one vertical side thereof. Journaled in a suitable bearing 23 mounted in the adjacent wall of said casing 2 is a spindle 24, upon the inner end of which is fixed a pinion 25 which operatively meshes with the teeth 22 of said rack and scale plate 21. Fixed on the exterior end of said spindle 24 is a knob 26 for rotating the spindle and pinion to raise or lower the rack and scale plate as may be desired. Secured to the upper end of said rack and scale plate 21 is a laterally projecting bracket 27 having a perpendicular seat 28 in its free end. The reference character 29 indicates an optical plunger, which is provided at its upper end with a suitable ferrule 30 receivable in said seat 28 of the bracket 27, so that the plunger will move up and down in company with the movement of the rack and scale plate. The lower free end of said plunger 29 extends downwardly into the fluid cup 14. It is desirable that the refractive index of the plunger 29 approximates that of the fluid under examination, a plurality of such plungers made of glass having various values of the index of refraction are therefore provided. Preferably said plunger is smaller in cross sectional area than the cross sectional area of the fluid cup bore (either by making the same of slightly less diameter than the diameter of said fluid cup bore, or by making the same of polygonal outline in cross section), so that when the same is lowered into the fluid cup it will displace the fluid therein, causing the latter to flow upwardly along the sides of the plunger. Connected with the upper end of said fluid cup 14 is an annularly enlarged portion 31 which provides a basin 32 for receiving the overflow of fluid driven from the fluid cup by the descent of the plunger, and which also permits a return flow of the fluid into the cup as the plunger is raised. It will thus be apparent that the depth of the column of fluid intermediate the end of the plunger and the bottom of the fluid cup may be increased or decreased at will by raising and lowering the plunger, and that the scale plate will raise and lower proportionately to the plunger movement to alter the reading of a scale as the depth of fluid alters.

Suitably inscribed on said scale plate is a scale, preferably reading in millimeters. The wall of said casing 2 adjacent to the scale plate is cutaway to provide an opening 33 in which the scale plate is exposed. Fixed at one side of said opening is a vernier scale plate 34. Supported by a bracket 35 for angular outward projection relative to said opening 33 and the vernier scale plate 34 is a reflector 36 upon which is reflected the scale reading, so that the same may be more conveniently observed by the operator.

One wall of the casing 2 is provided with openings giving access to the chamber 3 and the illumination chamber 5, said openings being normally closed by a sliding door 37 suitably arranged in connection with the casing.

Fixed upon the upper end of said casing 2 is a base-member or support 38 for mounting a suitable optical viewing instrument. Said base-member or support 38 is provided with a centrally disposed vertical opening 39 which registers with the opening or aperture 4 in the upper end of said casing 2. Extending upwardly from said base-member or support 38 is an externally threaded boss 40 of reduced diameter. Threaded on said boss 40 is the fixed tubular barrel 41 of the optical viewing instrument, in the interior of which is fixed a suitable lens 42. Telescopically slidable in connection with the upper end of said fixed tubular barrel 41, is an adjustable tubular barrel 43, having arranged within the same a suitable lens 44. Connected with the upper free end of said adjustable tubular barrel 43 is an eye-piece 45 also provided with a suitable lens 46. A suitable means for adjusting the position of said barrel 43 relative to the barrel 41 is provided, so that the optical viewing instrument may be focused relative to the objects viewed therethrough. Illustrative of such an adjusting means, I have shown the barrel 43 provided with a collar 47 having a laterally projecting arm 48 to which is fixed a depending screw 49, and in like manner, the barrel 41 is provided with a collar 50 having a pair of vertically alined bearing arms 51 in which is rotatably journaled an adjusting nut 52 through which the screw 49 extends. As will be clearly understood, by turning the nut 52 the screw 49 is caused to rise or lower, thus causing a rising or lowering movement of the barrel 43 and its lens relative to the barrel 41 and its lens, at the will of the operator, so that a desired focusing adjustment of the optical viewing instrument may be thus attained.

Since it is sometimes desired to interpose a color filter between the viewing instrument and the objects viewed thereby, a transverse slideway or receiving slot 53 is provided in the base-member or support 38. When not in use said slideway or slot 53 may be closed, so as to exclude light, by means of the annular gate-ring 54 which surrounds said base-member or support 38, and which turns thereon; a finger-piece 55 being provided in connection therewith for manipulating the same.

In employing the above described instrument in the practice of the methods involved in the use of this invention, the following operations take place, which will serve both to explain the methods, per se, and also the manner of manipulating the instrument.

Assuming, first that it is desired to measure the degree of cloudiness, i. e. the turbidity, of a fluid, the fluid cup 14 is supplied with a comparatively small quantity of the fluid to be measured, and then is placed in position in the fluid cup seat 11 of the holder block 9, so that the optical plunger 29 enters the upper end of said fluid cup. Before placing the fluid cup in position, a target 18 is seated in the target seat 12 so as to be alined beneath the transparent bottom of the fluid cup and the light source. The said targets 18 are preferably opaque, as when made of platinized or silvered glass, but so designed as to admit therethrough only lines or dots of light; or said targets may be made of clear glass with designs etched or painted thereon. The designs are preferably composite in nature, consisting of two or three different designs or line arrangements with fixed mathematical differences in dimensions and contrast. The above types of targets are illustrated in Figures 6 and 7; in which Figure 6 shows an opaque silvered glass target having two transparent lines —$a$— through which light may pass; and Figure 7 shows a clear glass target having etched lines —$b$— and a heavy focus mark —$c$—. A third type of target may be employed which operates upon the principle of resolving lines so fine that they cannot be resolved by the naked eye, making use of the optical viewing instrument to magnify such fine lines, and in this way permitting the direct measurement of very fine turbidities which are not otherwise measurable. This latter type of target is shown in Figure 8, in which gross lines —$x$— are arranged at one side or hemisphere, and the fine lines —$y$— are arranged at the other side or hemisphere, —$z$— representing the heavy meridian or focus line.

When using the first described type of target, the fluid to be measured is observed through the optical viewing instrument and optical plunger, the transparent lines —$a$— being illuminated by the lamp 8 and magnified by the optical viewing instrument, which operates not only to make the lines more visible but also to magnify the turbidity itself. By manipulating the knob 26, the optical plunger 29 is raised or lowered to increase or decrease the depth of the fluid, as may be necessary to determine at just what depth the illuminated and magnified transparent lines of the target disappear, which gives the reading point on the scale of the instrument, since, as above explained, the scale reading varies as the depth of the fluid varies. The operation with this type of target may be said to depend upon light extinction. In this way direct measurements of degrees of turbidity are obtained, which, for quantitative work, are referred to standardized tables prepared for the particular test being carried on.

When using the second type of target, the focus mark —$c$— is kept in view, while it is noted at just what depth the accompanying lines or marks —$b$— disappear, which thus gives the reading point on the scale denoting the degree of cloudiness or turbidity of the fluid under examination; the operation in this case depending upon the extinction or disappearance of the target mark.

When using the third type of target, the operation depends upon the principle of optical resolution. A heavy turbidity will obscure heavier target lines than will a finer turbidity. Finer lines will therefore measure finer turbidities, and by the employment of magnification, lines which are too fine to be resolvable by the naked eye may be used as a measure for finer turbidities, and this optical effect is enhanced by the fact that when such magnification is employed, it also magnifies the turbidity itself. Depending upon the degree of turbidity to be measured, the lines on the target are spaced at different intervals, and are so arranged that the lines on opposite sides of the focusing meridian bear a definite mathematical relationship to each other, as regards contrast and interval. When using this type of target, the turbidity reading is taken at a depth where the finer lines of the target merge into a homogeneous field, and the heavier lines of the same are still visible.

In making turbidity measurements variation in color of the fluids to be measured may be compensated for by interposing a suitable color filter between the light source and the target, or between the optical viewing instrument and the fluid. A properly selected and interposed color filter, which is complementary to the color of the fluid examined, will serve to neutralize or compensate the color of the fluid, so as to eliminate likelihood that the presence of the color in the fluid under examination will influence the optical comparison or resolution of the target marks or images, and consequently the scale reading would be the same as that arrived at for a colorless fluid of an equal degree of turbidity.

In measuring colors, for colorimetry work, color filters are interposed between the fluid cup and content and the light source, or between the fluid cup and content and the optical viewing instrument, and such filters have spectra complementary to the fluid under examination, so that the depth of fluid at which the color of the complementary filter is absorbed, and at which the color visible in the field of view changes to a neutral gray tint, gives the reading point on the scale, which is compared with prepared tables of scale readings obtained by the use of fluids having the predetermined standard color for the particular test being carried on, thus enabling a ratio of the measurement of the unknown to the measurement of the known standard to be attained.

In conjunction with said complementary filters or in lieu of them, the optical viewing instrument arranged to give spectra may be employed. In other words a spectroscope may be employed as the optical viewing instrument, and by preparing tables to show the scale reading point at which, when a fluid of a predetermined or known standard of color is examined, certain spectra are neutralized or absorbed, standard data is obtained with which to compare the scale reading at which the same spectra are neutralized or absorbed when the fluid of unknown color value is examined.

Since many fluids which are to be examined have both turbidity and color, the methods above described for turbidimetry and colorimetry may be practiced upon the same specimen by a substantially simultaneous operation, to give measurements both of turbidity and color.

From the above description the general principles of the method of direct turbidimetrical and colorimetrical measurement will be understood, and it will be also understood that although the apparatus shown and described for practicing the method is preferred, the steps of the said method may, in a broad sense, be practiced through the medium of mechanical aids other than the particular apparatus described, consequently, so far as method is concerned I do not limit myself to the use of said particular apparatus.

I claim:—

1. In an apparatus of the kind described, the combination with an enclosing casing of a fluid cup having a transparent bottom, a transparent plunger entered in the upper end of said fluid cup, said plunger having substantially the same index of refraction as the fluid with which the fluid cup is charged for examination, means for raising and lowering said plunger to vary the depth of fluid in said fluid cup, means cooperating with said plunger actuating means for indicating the adjusted depth of the content of said fluid cup, means for illuminating the content of said fluid cup, a target, and means for supporting said target intermediate the fluid cup and illuminating means whereby said target is rendered visible through the content of said fluid cup.

2. In an apparatus of the kind described, the combination with an enclosing casing of a fluid cup having a transparent bottom, a transparent plunger entered in the upper end of said fluid cup, said plunger having substantially the same index of refraction as the fluid with which the fluid cup is charged for examination, means for raising and lowering said plunger to vary the depth of fluid in said fluid cup, means cooperating with said plunger actuating means for indicating the adjusted depth of the content of said fluid cup, means for illuminating the content of said fluid cup, a target, means for supporting said target intermediate the fluid cup and illuminating means whereby said target is rendered visible through the content of said fluid cup, and a focusable optical viewing instrument having magnifying powers alined above said fluid cup and plunger and focusable upon said target.

In testimony, that I claim the invention set forth above I have hereunto set my hand this 8th day of June, 1922.

WILLIAM G. EXTON.